United States Patent [19]
Traw et al.

[11] Patent Number: 6,009,527
[45] Date of Patent: Dec. 28, 1999

[54] COMPUTER SYSTEM SECURITY

[75] Inventors: C. Brendan S. Traw, Hillsboro, Oreg.;
Eric C. Hannah, Pebble Beach, Calif.;
Jerrold V. Hauck, Fremont, Calif.;
Richard L. Coulson; Brad W. Hosler,
both of Portland, Oreg.

[73] Assignee: Intel Corporation, Santa Clara, Calif.

[21] Appl. No.: 08/959,101

[22] Filed: Oct. 23, 1997

Related U.S. Application Data

[63] Continuation of application No. 08/626,221, Mar. 29, 1996, abandoned.

[60] Provisional application No. 60/006,431, Nov. 10, 1995, provisional application No. 60/011,320, Feb. 8, 1996, and provisional application No. 60/013,302, Mar. 8, 1996.

[51] Int. Cl.⁶ ........................................ G06F 12/14
[52] U.S. Cl. .................. 713/200; 710/8; 710/126
[58] Field of Search ...................... 395/186, 187.01, 395/306, 307, 308, 283, 281, 828; 713/200, 201, 202; 710/101, 103, 126, 127, 128, 8

[56] References Cited

U.S. PATENT DOCUMENTS

| | | | |
|---|---|---|---|
| 4,937,785 | 6/1990 | Deering | 395/280 |
| 5,099,417 | 3/1992 | Magar et al. | 395/425 |
| 5,202,997 | 4/1993 | Arato | 395/186 |
| 5,204,961 | 4/1993 | Barlow | 395/187.01 |
| 5,263,139 | 11/1993 | Testa et al. | 395/307 |
| 5,310,998 | 5/1994 | Okuno | 235/380 |
| 5,392,407 | 2/1995 | Heil et al. | 395/293 |
| 5,392,422 | 2/1995 | Hoel et al. | 395/293 |
| 5,394,522 | 2/1995 | Sanchez-Frank et al. | 395/349 |
| 5,434,976 | 7/1995 | Tan et al. | 395/200.07 |
| 5,438,185 | 8/1995 | Narukawa | 235/441 |
| 5,475,818 | 12/1995 | Molyneaux et al. | 395/200.05 |
| 5,506,961 | 4/1996 | Carlson et al. | 395/186 |
| 5,556,107 | 9/1996 | Carter | 463/35 |
| 5,564,025 | 10/1996 | De Freese et al. | 359/290 |
| 5,564,110 | 10/1996 | Ueda | 395/828 |
| 5,581,712 | 12/1996 | Herrman | 395/283 |
| 5,581,714 | 12/1996 | Amini et al. | 395/285 |
| 6,540,551 | 9/1995 | Amini et al. | 395/308 |

OTHER PUBLICATIONS

Clarkson, "Seriously Serial", Byte Magazine, pp. 117–122, Aug, 1994.

Teener et al., "A Bus on a Diet–The Serial Bus Alternative", Compcon, IEEE, pp. 316–321, 1992.

Diamond, "P1394: Good For Desktops and Posrtable", IEEE Micro, vol. 15 Iss.2, pp. 81–83, Apr. 1995.

*Primary Examiner*—Dieu-Minh T. Le
*Attorney, Agent, or Firm*—Duane, Morris & Heckscher LLP; William H. Murray; N. Stephan Kinsella

[57] ABSTRACT

Security from an unwanted intrusion into a computer system is provided by coupling a host component with a peripheral component using a high-speed serial bus having a high-speed physical layer and using features of the bus to implement the security. In an embodiment, the high-speed serial bus has a secondary bus layer that is used to implement a number of the security features of the invention.

37 Claims, 6 Drawing Sheets

COMPUTER SYSTEM SECURITY

This is a Continuation application of application Ser. No. 08/626,221, filed Mar. 29, 1996, now abandoned.

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. applications Nos. 60/006,431, filed under 35 U.S.C. §111(b) on Nov. 13, 1995; 60/011,320, filed under 35 U.S.C. §111(b) on Feb. 8, 1996; and 60/013,302, filed under 35 U.S.C. §111(b) on Mar. 8, 1996, the teachings of all three being incorporated herein by reference.

BACKGROUND OF THE INVENTION

1. Field of the Invention

This invention relates to the field of computer system security for preventing unwanted intrusion into a computer system.

2. Background of the Invention

The vast amount of data and information stored in and processed by computers makes them obvious targets for corporate spies and other information thieves. Unfortunately, computers generally are susceptible to security breaches. An ability of a bus coupling a host computer to one or more peripherals to use a direct memory access (DMA) engine to directly read from and write to the host computer's physical memory locations exacerbates the problem. For example, a rogue device can be tapped into the network and can use the DMA engine to obtain massive amounts of data from the host and its peripherals. A bus with this ability to use a host DMA engine is described in U.S. Provisional Applications Ser. Nos. 60/006,431; 60/011,320; and 60/013,302, filed on Nov. 10, 1995, Feb. 8, 1996, and Mar. 8, 1996, respectively. Since peripherals attached to such a bus may be several meters away from the host computer, an unwanted attachment of a rogue device to the bus which could monitor data traffic on the bus and directly access host memory could go unnoticed by legitimate system users.

Conventionally, an addition of security features to a modern, high-performance computer system necessitated incurring substantial costs, especially in order to avoid causing diminished system performance. There is a need, therefore, for a reliable, low-cost security system to prevent unwanted intrusions into a computer system. Optimally, the system should not affect system performance.

SUMMARY OF THE INVENTION

Security from an unwanted intrusion into a computer system is provided by coupling a host component with a peripheral component using a high-speed serial bus having a high-speed physical layer and using features of the bus to implement the security.

BRIEF DESCRIPTION OF THE DRAWINGS

The following detailed description will be more fully understood with reference to the accompanying drawings in which.

DETAILED DESCRIPTION OF PREFERRED EMBODIMENTS

Figure 1:
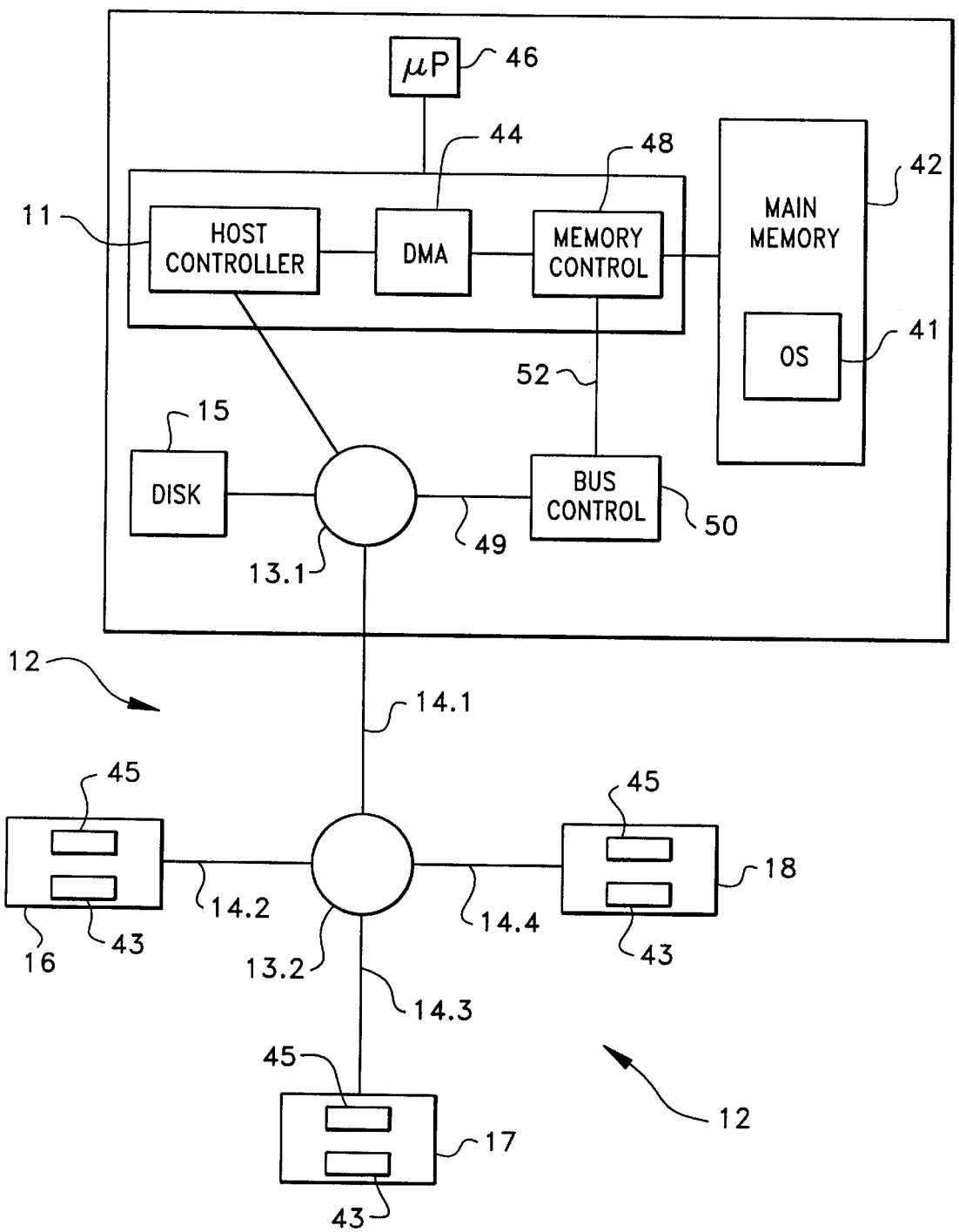
FIG. 1 is a block diagram of a system of the invention using a high-speed serial bus for providing security.

A topology of a system embodying the invention is shown in FIG. 1. Host computer 10 includes host controller 11, which provides an interface to bus hub 13.1. Host controller 11 governs data movement between host 10 and peripherals 16–18 and provides an interface to the memory system of host 10, such as DMA engine 44, memory controller 48 and memory 42. Host controller 11 is coupled to DMA engine 44, which is coupled to memory controller 48. In an embodiment, host controller 11, DMA engine 44 and memory controller 48 are part of a single integrated circuit.

The high-speed physical layer or links of bus system 12, to be described below, can communicate with DMA engine 44 to directly access memory 42, for example through memory controller 48. The direct memory accessing capability of bus system 12 contributes to the very low latency of the bus system. Peripherals on bus system 12, such as peripherals 16–18 are permitted real-time, direct access to host memory 42 using DMA engine 44.

Bus system 12 includes hub 13.1 located within the confines of host computer 10. One or more mass storage devices such as disk drive 15 is coupled to hub 13.1. Bus cable 14.1 couples internal hub 13.1 to external hub 13.2 onto which a plurality of peripherals can be coupled. Various peripherals 16–18 can be coupled to hub 13.2 by bus cables 14.2, 14.3 and 14.4. For the purposes of this disclosure, the high-speed bus and bus system 12 means any of cables 14.1–14.4 and hubs 13.1 and 13.2. Peripherals which can be coupled to hubs 13.1 or 13.2 include, for example, printers, scanners, cameras, disk drives, network interfaces, etc. As should be apparent to one of ordinary skill, coupled peripherals can be a substantial distance from host 10, especially when using multiple linked hubs 13.x. Furthermore, the high-speed links of bus cables 14.1–14.4 and hubs 13.1 and 13.2 use DMA engine 44 to allow peripherals 16–18 to directly access host computer memory 42. Although this latter feature of the bus helps provide it with the qualities of low latency and high bandwidth, it also makes host memory susceptible to unauthorized access by rogue devices coupled to any of buses 14.1–14.4 or hubs 13.1 and 13.2. The invention protects the security of host computer 10 to help prevent a hacker from directly accessing main memory 42 using DMA engine 44, through memory controller 48.

Figure 2:
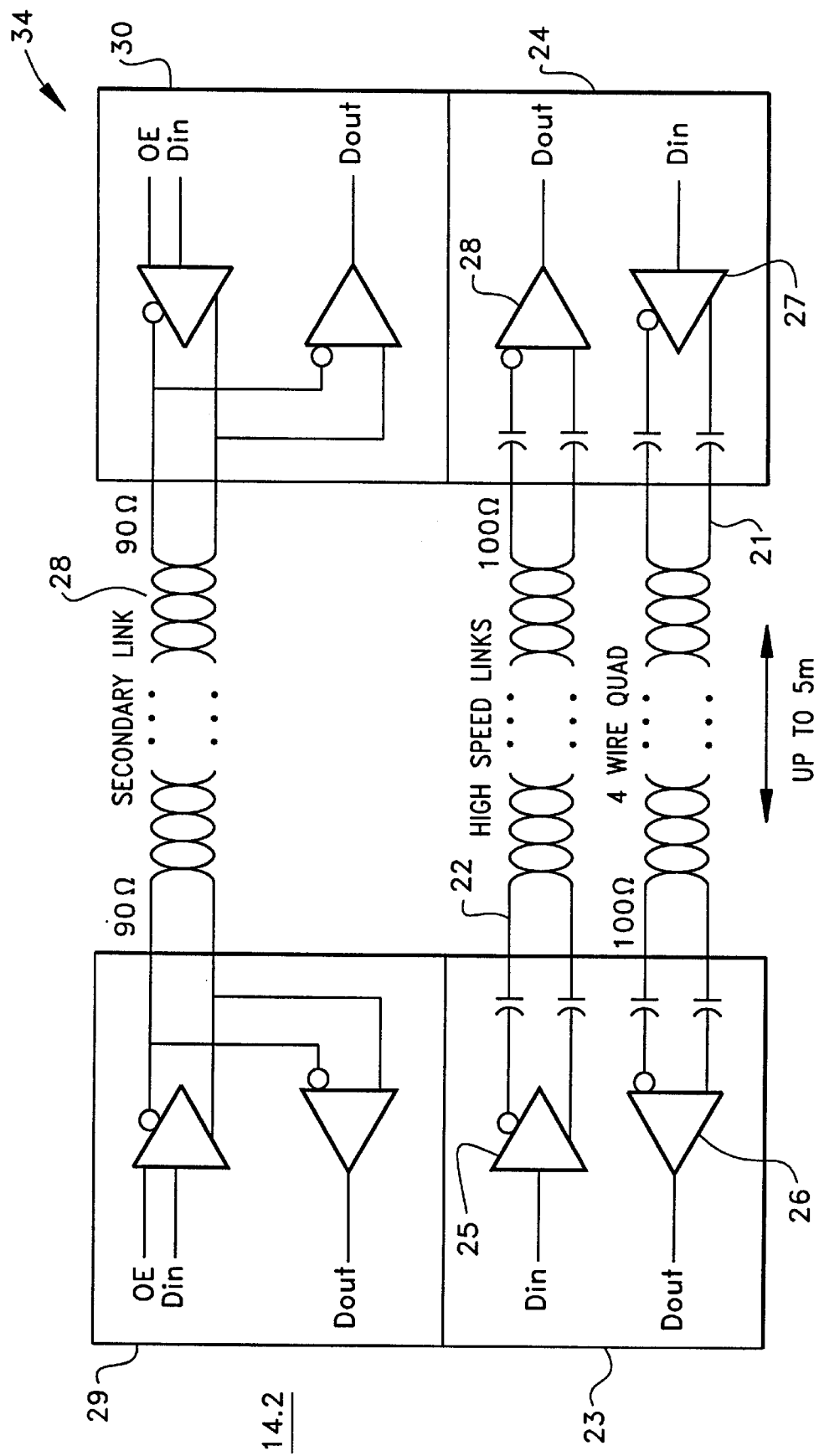
FIG. 2 is a schematic of a high-speed serial bus cable.

A schematic view of a bus cable is shown in FIG. 2. FIG. 2 shows, for example, bus cable 14.2 linking peripheral 16 to external hub 13.2, but it should be understood that FIG. 2. also can represent any of bus cables 14.1–14.4 and hubs 13.1 and 13.2. Bus cable 14.2 has a pair of opposing, unidirectional, high speed, shielded, twisted pairs defining high-speed physical layers or links 21 and 22, linking transceiver pairs 23 and 24. Transceivers 23 and 24 are AC coupled via shielded links 21 and 22 with 100 ohm differential impedance. Transceiver 23 has driver 25 and receiver 26. Transceiver 24 has driver 27 and receiver 28. Bus cable 14.2 also includes a secondary bus component 34, such as a Universal Serial Bus (USB), having link 28 which comprises a bidirectional pair coupling transceiver 29 with transceiver 30. USB is well known to those having skill in the art and a technical specification on the bus can be found on the World Wide Web at Uniform Resource Locator (URL) address http://www.teleport.com/~usb/. The invention makes substantial use of the secondary bus component in all of bus cables 14.1–14.4 and hubs 13.1 and 13.2 as service layers for implementing many security features of the invention, as will be more fully described below. The secondary link, such as a USB link, is available for implementing the security features because unlike the high-speed links of bus cables 14.1–14.4 and hubs 13.1 and 13.2, the secondary links do not have DMA engine access. No danger exists that a rogue device can access memory through the secondary links. Access to memory through the secondary links is controlled entirely, for example, by computer 10, for example by operating system 41 and processor 46, and thus the secondary links are inherently trusted by computer 10. No device can access host memory 42 through the secondary links without processor 46 and operating system 41 knowing about it. A peripheral using an active high-speed link of the bus system of the invention may directly access host memory 42, however, using DMA engine 44, without knowledge by processor 46 or operating system 41. It should be understood by a person of ordinary skill that operation of processor 46 and operating system 41 are mutually dependent and reference to one necessarily incorporates reference to the other.

The secondary links of bus cables 14.1–14.4 and hubs 13.1 and 13.2 are split-off from the high-speed links inside of computer 10. For example, a secondary lead 49 provides a secondary bus path to secondary bus controller 50. In an embodiment of the invention, secondary bus controller 50 is a USB bus controller known to those having skill in the art. Secondary bus controller 50 is coupled to memory controller 48 through an input/output (I/O) bus 52, such as a peripheral control interface (PCI) bus inside computer 10.

Figure 3:
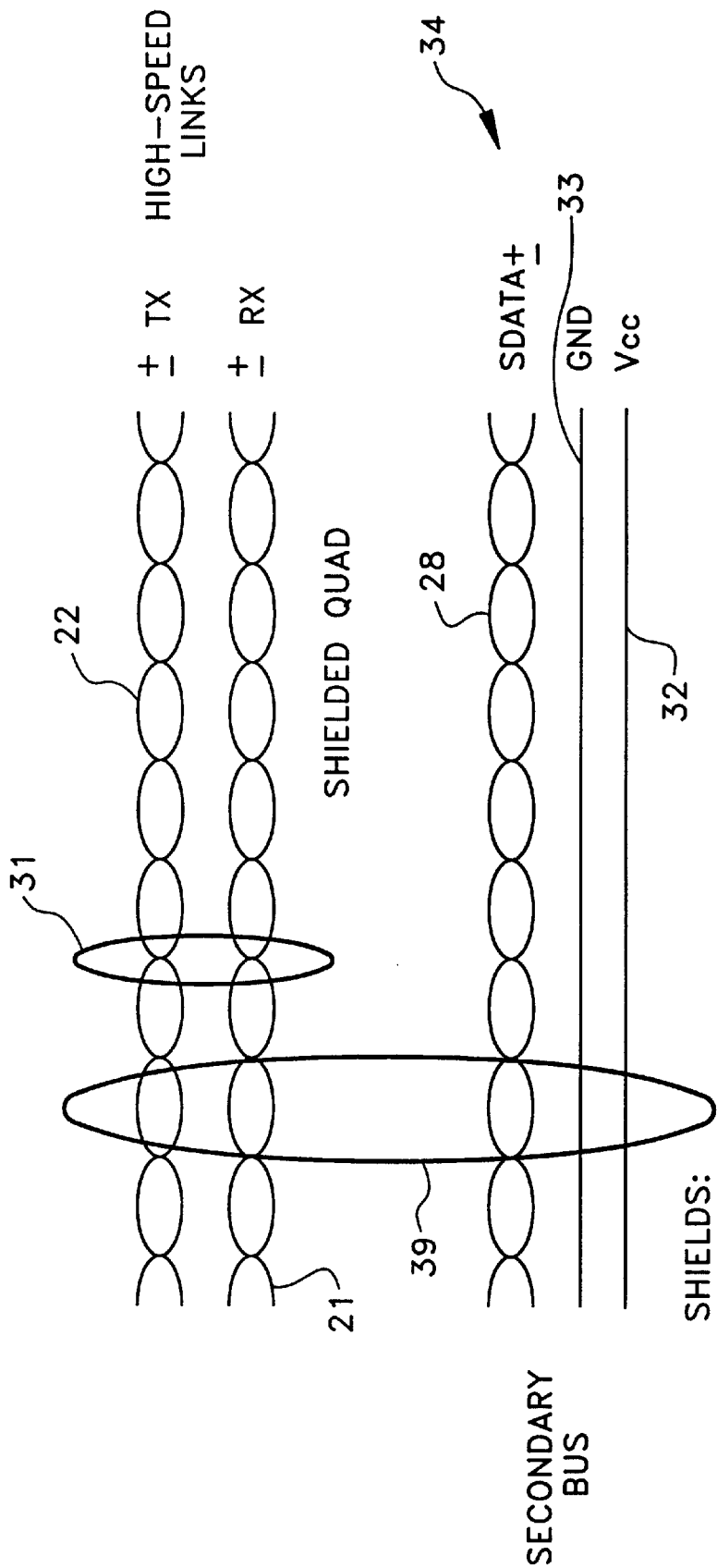
FIG. 3 is a schematic view of the wiring of the cable shown in FIG. 2.

FIG. 3 is a more detailed view of high-speed links 21 and 22 and secondary link 28 of bus cable 14.2. High-speed links 21 and 22 are twisted pairs having internal shielding 31. Links 21 and 22 are unidirectional, but combine to provide full-duplex communications. Secondary link 28 is a bi-directional, twisted pair path. All of links 21, 22, and 28 are shielded by shield 39. Voltage supply 32 and ground wires 33 also are associated with the secondary component 34 of bus cable 14.2.

Figure 4:
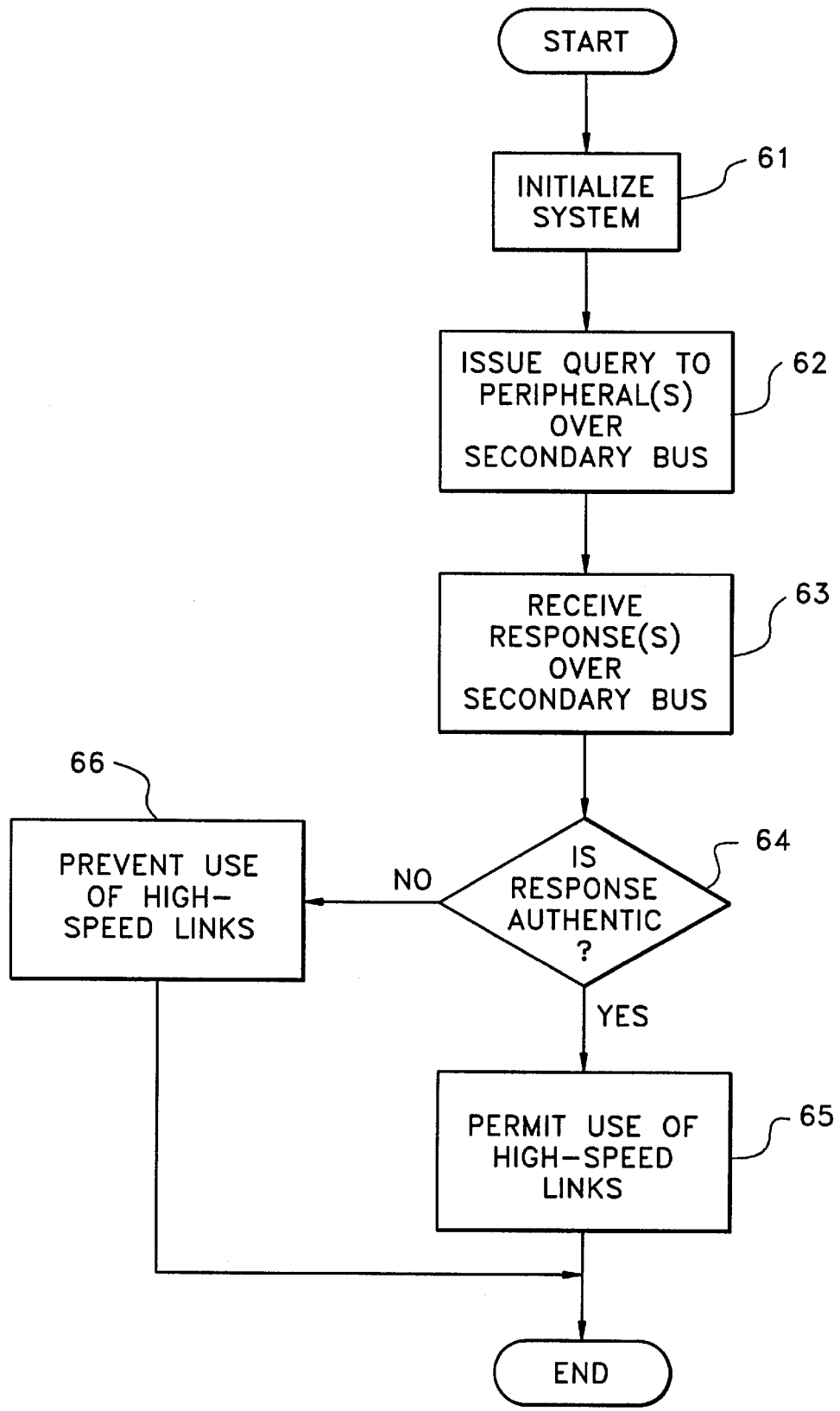
FIG. 4 is a flow chart of the operation of an embodiment of the invention.

The invention uses the secondary links in one or more of the high-speed bus cables 14.1–14.4 to provide the security features of the invention. For example, one method of providing security is to prevent use of a high-speed link, such as links 21 and 22 of bus cable 14.2, for example by disabling (or not enabling) transceivers 23 and 24 until the identity of a peripheral component, such as printer 16, is verified through the secondary links. Preferably, this is done at system initialization (step 61 at FIG. 4). For example, processor 46 and software in computer node 10, for example operating system 41, can attempt to identify the peripheral, such as peripheral 16, for example by checking through the secondary links for expected switch settings in switch 43 (step 62). A signal delivered to peripheral 16 from computer node 10 will be altered in a definable manner according to the switch settings, returned over the secondary links (step 63) and interpreted by processor 46 and operating system 41 in computer node 10 as a valid or invalid verification of the identity of peripheral 16 (step 63). In an alternative embodiment, an active component in a peripheral, such as peripheral 16, could transmit an expected message back to computer node 10 through the secondary links in response to a query or challenge received through the secondary links (step 64). Various authentication protocols, which are known to those having skill in the art, may be used by host 10 and a peripheral, such as peripheral 16, in the challenge and response transmissions. In any event, if the peripheral, such as peripheral 16 is affirmatively identified (step 64), operating system 41 in computer node 10 permits use of high-speed links 21 and 22 (step 65), such as by enabling high-speed transceivers 23 and 24 and use of other high-speed links in the physical data transmission path to peripheral 16. Use of the high-speed links is denied if the peripheral is not identified (step 66).

In another embodiment that uses the secondary links of bus cables 14.1–14.4, a writable storage medium, such as storage medium 45, can be installed in a peripheral intended for use with the bus system of the invention. The storage medium can be pre-encoded with a unique signature. In another embodiment, upon initial installation of the peripheral, software, such as operating system 41 resident in memory 42 on host computer 10 writes into storage medium 45 through secondary links the unique identifying code, which will be "remembered" by operating system 41 as the peripheral's dedicated signature. During subsequent system initializations (step 61), the operating system 41 in computer node 10 queries the peripheral through the secondary links (step 62), such as secondary link 28, for the dedicated signature stored in the storage medium 45 (step 63) before permitting use of the high-speed links (step 65), such as before enabling transceivers 23 and 24, for high-speed data transmission over the high-speed links of a bus cable, such as high speed links 21 and 22. Use of the high-speed links is denied to peripherals which fail to exhibit a proper signature to operating system 41 over the secondary links (step 66). Storage medium 45 can be, for example, a flash ROM into which the dedicated signature is stored by operating system 41 in computer node 10. In an embodiment, the high-speed links are enabled automatically, such as by operating system 41, upon recognition of the peripheral.

Figure 5:
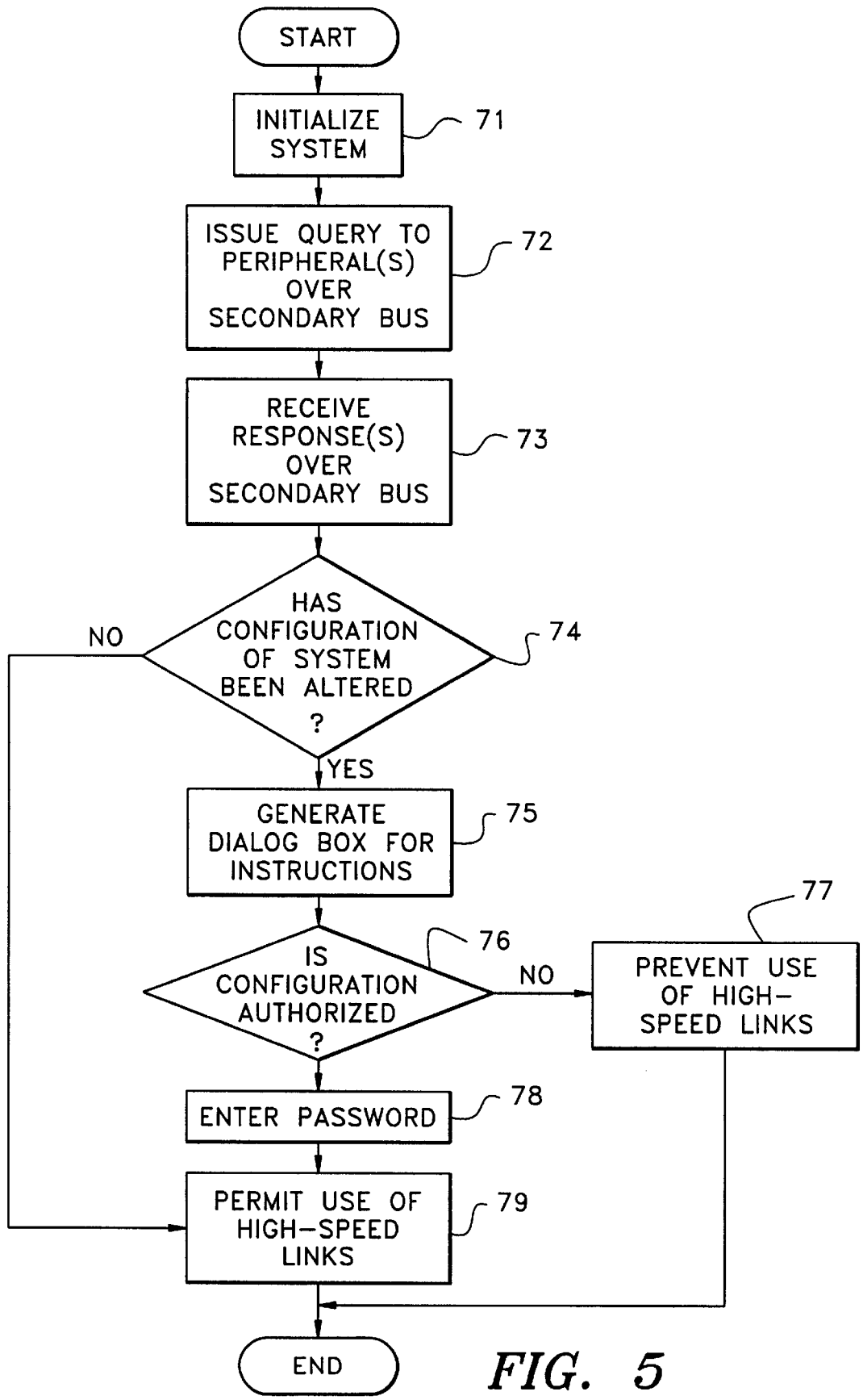
FIG. 5 is a flow chart of the operation of another embodiment of the invention.

Another feature of the invention provides a user of computer 10 with an opportunity to manually approve a change in system configuration. For example, a configuration of system 12 can be checked by operating system 41, for example at system initialization (step 71 of FIG. 5), through the secondary links of bus cables 14.1–14.4 and hubs 13.1–13.2, for example by investigating the presence and content of various known registers in peripherals as known by persons having ordinary skill in the art (step 72). In an embodiment of the invention, if a peripheral is found to have been added or removed through responses to the queries received over the secondary bus links (steps 73 and 74), operating system 41 generates a dialog box on a monitor attached to computer 10 (not shown in FIG. 1) to notify the user (step 75). Preferably, the user is requested to input instructions in response to the information gathered over the secondary links (step 76). For example, in the event a rogue device has been attached, the user can instruct the system to refrain from activation, such as by not enabling, or disabling, the high-speed transceivers of the high-speed data links of one or more of bus cables 14.1–14.4 and hubs 13.1–13.2 (step 77). A user also can cause acceptance of the peripheral (step 79), such as by entering the appropriate information including, preferably, a password when confronted with the dialog box generated by operating system 41 (step 78).

Figure 6:
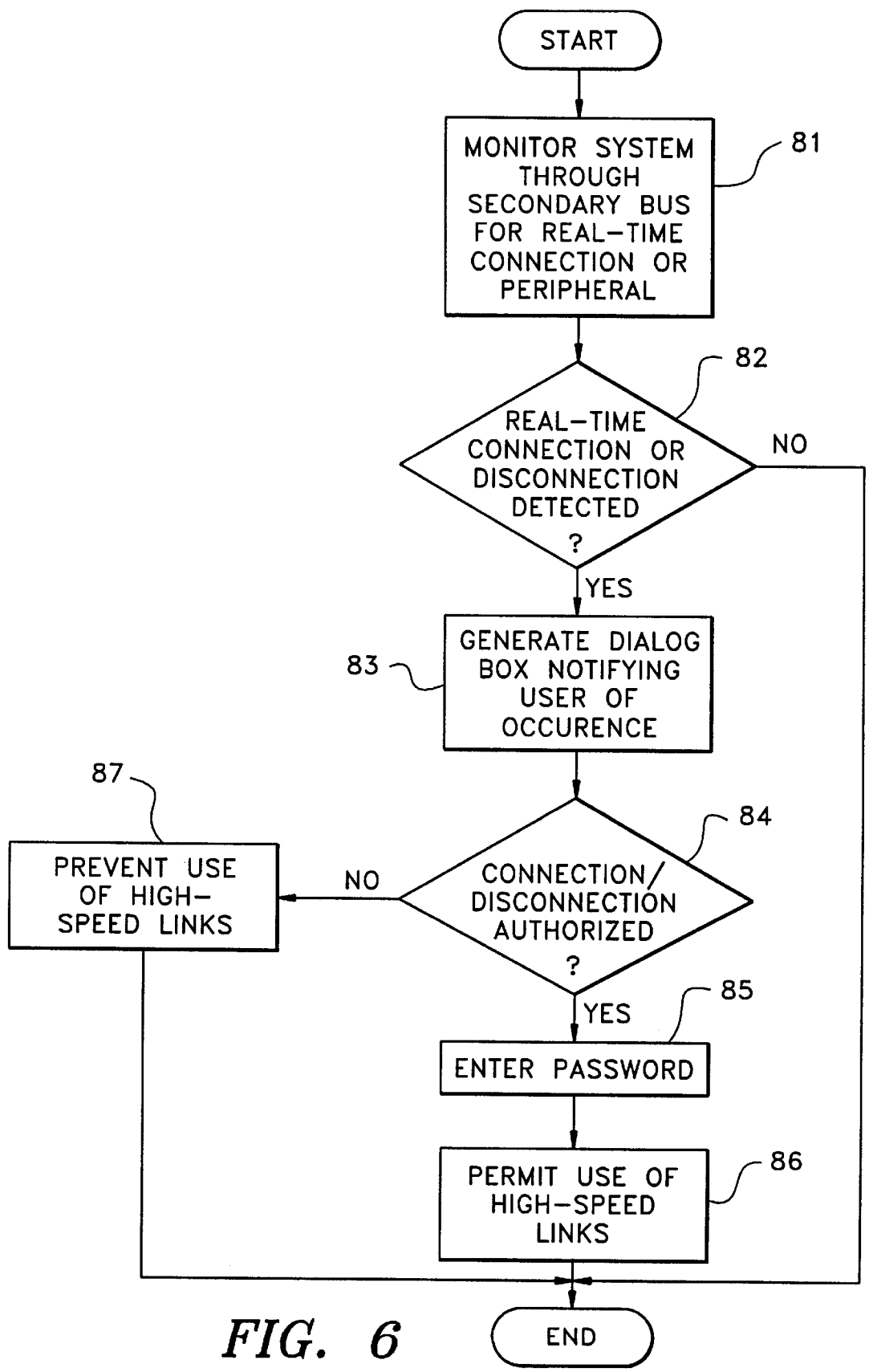
FIG. 6 is a flow chart of yet another embodiment of the invention.

Even after a system has been initialized and is running, the invention continues to provide security from unwanted intrusions and attempts to access memory 42. For example, operating system 41, through the secondary links of bus cables 14.1–14.4 and hubs 13.1 and 13.2, continues to monitor the system as it is running for an occurrence of any real-time plug and unplug events i.e., connections or disconnections of a peripheral while the system is running (step 81 of FIG. 6). In an embodiment, any connections or disconnections of a peripheral into hubs 13.1 or 13.2, or along any of bus cables 14.1–14.4 are detected by operating system 41 through the secondary links of the bus system (step 82). A user of computer node 10 preferably is notified of the hot plug or unplug, such as through a dialog box as discussed above, and can investigate the occurrence to learn of its nature (step 83). In a preferred embodiment, the dialog box specifies, for example, the location and identity of the hot plug or unplug. An interested user at host computer 10 can investigate the notification to determine whether unauthorized access has occurred or been attempted (step 84). In an embodiment, the user can enter a password allowing a hot-plugged peripheral to join the system (step 85), such as by enabling the relevant high-speed transceivers in any of bus cables 14.1–14.4 and hubs 13.1–13.2 (step 86). Of course, use of the high-speed links for unauthorized access will be prevented (step 87), either affirmatively or by a simple failure to enter authorization, such as a password, when prompted.

The invention therefore provides a variety of non-exclusive, low-cost and easily implemented security measures which protect a computer system from an unwanted intrusion. These security measures are especially important considering the direct memory accessing capabilities which can be provided using the high speed links of bus cables 14.1–14.4 and hubs 13.1 and 13.2 through DMA engine 44, which could be used for unauthorized accessing of main memory 42.

As described above, processor 46 and operating system 41 substantially control security system functionality, such as by generating and transmitting peripheral device queries, receiving responses thereto and generating graphical user interfaces, such as dialog boxes, pertaining to security issues. It should be understood to a person having ordinary skill that the activities of processor 46 and operating system 41 with respect to implementation of the security features of the invention can be handled by dedicated hardware and software, for example an expanded host controller 11 and special software in a dedicated memory or in memory 42.

The invention is described above with reference to a limited number of bus cables and hubs. It should be understood that the use of additional hubs and cables coupling additional peripherals to host 10 is within the scope of the invention.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A method for providing security from an unwanted intrusion into a host computer by a peripheral, comprising the steps of:
   (a) coupling the host computer with the peripheral using a high-speed serial bus having a high-speed physical layer and with a secondary bus within the high-speed serial bus, wherein the high-speed serial layer has a bandwidth sufficient to couple the peripheral directly to a memory of the host computer via a direct memory access (DMA) engine, wherein the high-speed serial layer is coupled to the DMA engine; and
   (b) using the secondary bus to implement the security, wherein the secondary bus is not coupled to the DMA engine.

2. The method of claim 1, wherein step (b) comprises the step of using the secondary bus to query an identity of the peripheral.

3. The method of claim 2, further comprising the step of:
   (c) generating an indicator concerning the identity of the peripheral.

4. The method of claim 3, further comprising the steps of:
   (d) accepting verification from a user of the identity of the peripheral; and
   (e) permitting use of the high-speed physical layer coupling to the peripheral.

5. The method of claim 2, further comprising the step of:
   (c) preventing use of the high-speed physical layer if the peripheral is unidentified.

6. The method of claim 2, further comprising the step of providing the identity to the peripheral through the secondary bus.

7. The method of claim 1, wherein step (b) comprises the step of using the secondary bus to detect the occurrence of a real-time connection or disconnection of a peripheral to the high-speed serial bus.

8. The method of claim 7, further comprising the step of:
   (c) generating an indicator when the real-time connection or disconnection of a peripheral is detected.

9. The method of claim 8, wherein a peripheral has been connected, further comprising the steps of:
   (d) accepting verification from a user of the connection of the peripheral; and
   (e) permitting use of the high-speed physical layer coupling to the peripheral.

10. An apparatus for providing security from an unwanted intrusion into a host computer by a peripheral, comprising:
    (a) means for coupling the host computer with the peripheral using a high-speed serial bus having a high-speed physical layer and with a secondary bus within the high-speed serial bus, wherein the high-speed serial layer has a bandwidth sufficient to couple the peripheral directly to a memory of the host computer via a direct memory access (DMA) engine, wherein the high-speed serial layer is coupled to the DMA engine; and
    (b) means for using the secondary bus to implement the security, wherein the secondary bus is not coupled to the DMA engine.

11. The apparatus of claim 10, wherein means (b) uses the secondary bus to query an identity of the peripheral.

12. The apparatus of claim 11, further comprising:
   (c) means for generating an indicator concerning the identity of the peripheral.

13. The apparatus of claim 12, further comprising:
   (d) means for accepting verification from a user of the identity of the peripheral; and
   (e) means for permitting use of the high-speed physical layer coupling to the peripheral.

14. The apparatus of claim 11, further comprising:
   (c) means for preventing use of the high-speed physical layer if the peripheral is unidentified.

15. The apparatus of claim 11, wherein means (b) provides the identity to the peripheral through the secondary bus.

16. The apparatus of claim 10, wherein means (b) uses the secondary bus to detect the occurrence of a real-time connection or disconnection of a peripheral to the high-speed serial bus.

17. The apparatus of claim 16, further comprising:
   (c) means for generating an indicator when the real-time connection or disconnection of a peripheral is detected.

18. The apparatus of claim 17, wherein a peripheral has been connected further comprising:
   (d) means for accepting verification from the user of the connection of the peripheral; and
   (e) means for permitting use of the high-speed physical layer coupling to the peripheral.

19. An apparatus for providing security against unwanted access to a host computer by a peripheral, comprising:
   (a) a high-speed serial bus having a high-speed physical layer for coupling the host computer to the peripheral, and a secondary bus within the high-speed serial bus for coupling the host to the peripheral, wherein the high-speed serial layer has a bandwidth sufficient to couple the peripheral directly to a memory of the host computer via a direct memory access (DMA) engine, wherein the high-speed serial layer is coupled to the DMA engine; and
   (b) means for controlling the apparatus to implement the security using the secondary bus, wherein the secondary bus is not coupled to the DMA engine.

20. The apparatus of claim 19, wherein the means for controlling is a microprocessor on the host.

21. The apparatus of claim 19, wherein the means for controlling uses the secondary bus to query an identity of the peripheral.

22. The apparatus of claim 21, wherein the means for controlling generates an indicator concerning an identity of the peripheral.

23. The apparatus of claim 22, wherein the means for controlling:
   accepts verification from a user of the identity of the peripheral; and
   permits use of the high-speed physical layer coupling to the peripheral.

24. The apparatus of claim 21, wherein the means for controlling prevents use of the high-speed physical layer if the peripheral is unidentified.

25. The apparatus of claim 19, wherein the means for controlling uses the secondary bus to detect the occurrence of a real-time connection or disconnection of a peripheral to the high-speed serial bus.

26. The apparatus of claim 25, wherein the means for controlling generates an indicator when the connection or disconnection of a peripheral is detected.

27. The apparatus of claim 26, wherein when a peripheral has been connected:
   the means for controlling accepts verification from the user of the connection of the peripheral; and
   the means for controlling permits use of the high-speed physical layer coupling to the peripheral.

28. A storage medium having stored thereon a plurality of instructions for providing security from an unwanted intrusion into a host computer by a peripheral coupled to the host computer by a high-speed serial bus having a high-speed physical layer and a secondary bus, wherein the plurality of instructions, when executed by a processor of the host computer, cause the host computer to perform the steps of:
   (a) supervising provision of the security, wherein the high-speed serial layer has a bandwidth sufficient to couple the peripheral directly to a memory of the host computer via a direct memory access (DMA) engine, wherein the high-speed serial layer is coupled to the DMA engine; and
   (b) using the secondary bus to implement the security, wherein the secondary bus is not coupled to the DMA engine.

29. The storage medium of claim 28, wherein step (b) comprises the step of using the secondary bus to query an identity of the peripheral.

30. The storage medium of claim 29, wherein the plurality of instructions cause the host computer to perform the further step of:
   (c) generating an indicator concerning the identity of the peripheral.

31. The storage medium of claim 30, wherein the plurality of instructions cause the host computer to perform the further steps of:
   (d) accepting verification from a user of the identity of the peripheral; and
   (e) permitting use of the high-speed physical layer coupling to the peripheral.

32. The storage medium of claim 29, wherein the plurality of instructions cause the host computer to perform the further step of preventing use of the high-speed physical layer if the peripheral is unidentified.

33. The storage medium of claim 29, wherein the plurality of instructions cause the host computer to perform the further step of providing the identity to the peripheral through the secondary bus.

34. The storage medium of claim 28, wherein step (b) comprises the step of using the secondary bus to detect the occurrence of a real-time connection or disconnection of a peripheral to the high-speed serial bus.

35. The storage medium of claim 34, wherein the plurality of instructions cause the host computer to perform the further step of generating an indicator when the real-time connection or disconnection of a peripheral is detected.

36. The storage medium of claim 35, wherein the plurality of instructions cause the host computer to perform the further steps of:
   accepting verification from the user of the connection of the peripheral; and
   permitting use of the high-speed physical layer coupling to the peripheral.

37. The storage medium of claim 28, wherein the computer program code is an operating system.

* * * * *